Patented Feb. 10, 1931

1,791,515

UNITED STATES PATENT OFFICE

HARRY F. SMITH, OF DAYTON, OHIO, ASSIGNOR TO FRIGIDAIRE CORPORATION, OF DAYTON, OHIO, A CORPORATION OF DELAWARE

ABSORBENT FOR REFRIGERATING APPARATUS

No Drawing.    Application filed May 30, 1929.  Serial No. 367,156.

This invention relates to solid absorbent materials for refrigerating apparatus of the absorption type.

It is one of the objects of the invention to provide a solid or dry absorbent material which is mechanically stable, that is one which does not materially change its apparent physical or mechanical form or migrate from one place to another over long periods of operation.

Another object is to provide an absorbent material or structure in which the individual particles of the the material are held together in such a manner as to permit expansion and contraction of the particles themselves and movement incidental or necessary thereto, of the particles or small aggregates thereof without disturbing large aggregates of particles or the mass of material as a whole.

Another object is to provide an absorbent material having a large amount of surface exposed to refrigerant, and a large number of gas passages throughout the material so as to assure free passage of refrigerant into and out of the mass of material.

Further objects and advantages of the present invention will be apparent from the following description and claims.

Dry absorption refrigerating systems using a solid or dry absorbent material for the refrigerant have heretofore been proposed, for example systems using calcium chloride for alternately absorbing and evolving ammonia. Such systems have not proved wholly successful due, in part at least, to the fact that calcium chloride (and substances of like nature which constitute the chief absorbents for ammonia) expand tremendously upon absorbing ammonia, and contract or shrink correspondingly upon evolving ammonia. This results in an inherent mechanical instability of the structure of the mass of absorbent material which prevents it from being kept in any constant form or shape, prevents it from being kept in satisfactory heat exchange relation with heating and cooling devices essential to the system, and causes the particles to migrate during evolution and absorption so as to produce progressive concentration of particles in certain spaces at the expense of other spaces. Such migration and concentration frequently develops sufficient force to destroy containers or generator-absorbers in which the material is used.

My invention is concerned with eliminating these phenomena and producing a solid absorbent structure which will retain its size, shape and position under all conditions of the cycle of operation and will not exert destructive forces upon vessels in which it is confined.

I prefer to use as absorbent strontium chloride. This material is very similar to calcium chloride as regards its affinity for ammonia, its formation of definite chemical compounds known as addition products or addition-compounds with ammonia, and its behavior during the absorption and evolution of ammonia. Strontium chloride, $SrCl_2$ absorbs ammonia to form any one of the following addition-compounds, ammoniates, or ammines: Strontium chloride 1-ammine, $SrCl_2NH_3$; strontium chloride 2-ammine, $SrCl_2 2NH_3$; and strontium chloride 8-ammine, $SrCl_2.8NH_3$. The manner in which the material is converted from one ammine to another to absorb or evolve ammonia and the conditions necessary to such conversion are known physical-chemical data, being mentioned for example in the patent to F. G. Keyes, 1,698,847, January 15, 1929, and in my companion application for refrigerating apparatus, Serial No. 367,157, filed of even date herewith.

Pure anhydrous strontium chloride is a very fine powder or dust. A mass of this material consists of individual extremely minute particles contacting with each other at isolated points and thus providing free spaces between the particles. The mass is similar in type to loose broken gravel. When this material is exposed to ammonia under the proper temperature and pressure conditions, the ammonia gas enters the spaces between the particles and each particle is converted into a particle of the particular ammoniate which corresponds to the pressure and temperature. A particle of any ammoniate is larger than a particle of a lowerorder ammoniate or of the pure strontium chloride. Consequently whenever the material absorbs ammonia the individual particles swell, and if the spaces between them are not sufficient to hold the enlarged particles, the body as a whole must swell or large aggregates of particles must be moved. If the material is confined so that it cannot swell, extremely high pressures are developed, which may distort or destroy containers, and in any event the material may pack so as to obstruct the gas passage between the particles and prevent free ingress or egress of ammonia.

As a specific example, $SrCl_2.8NH_3$ when in one condition which is considered a well packed powder, has a bulk density of 43 pounds per cubic foot. In this the free gas space is about 50% of the total. Assume that a quantity of this material is placed in an ordinary laboratory glass test tube and heated to drive off ammonia and convert the material into $SrCl_2.NH_3$. The free gas space would become about 80% of the total if the apparent volume of the entire body remained the same. However, the particles may fall into these larger spaces between them causing the entire mass to shrink, crack and settle until the volume of the entire body is reduced, frequently as much as 20%. Upon subsequently absorbing ammonia, the particles again tend to expand, but the entire body of material is not restored to its former size, shape, or position because the movements of the particles and of large aggregates during the evolution are too great and too random to be merely reversed to restore the particles to their original positions during absorption.

There is a large amount of friction between each individual particle and those with which it contacts which resists this movement and this friction is sufficient to cause the particles at the top of the mass (which is the only direction in which the mass is free to expand) to pack together and block the tube like a tightly fitting cork, so that the top layer is not moved by the pressure of the expanding particles beneath it. This will result in the development of high pressure beneath the surface which has two necessary results, the one pressing of the particles into the spaces so as to pack the powder into a chalk-like mass, and the other exertion of considerable force on the container. Both of these results are undesirable, the first because the filling of the spaces between the particles blocks the passages for the ingress and egress of ammonia gas, and the second because it may destroy the container. Subsequent alternate evolution and absorption of ammonia will cause the powder to progressively settle and progressively pack until the resistance to expansion developed at the top of the mass may cause the expansion of material confined below the surface to burst the test tube.

I have discovered that the particles of strontium chloride or other absorbent materials having similar characteristics can be agglomerated in such a manner as to prevent the alternate expansion and contraction, as well as progressive concentration of the mass of material as a whole. This is accomplished by mixing with the powdered material a small quantity of a suitable viscous liquid and distributing the liquid throughout the entire mass so that each particle is wet by a thin film. The liquid used must obviously be of such character as to wet the particles of the absorbent material with which it is employed. When the liquid is thoroughly distributed throughout the powder, it forms a thin film over the surface of each individual particle, and where the particles contact with each other the liquid film becomes thicker in the inter-spaces or corners immediately surrounding the points of contact. This is due to the known phenomena of capillarity and surface tension. Where the particles are in contact with each other the thicker film of liquid will cause the particles to adhere together. While the liquid employed must be sufficiently viscous to cause the particles to adhere, yet it must not be too viscous to prevent its flowing into the corners around the points of contact. Likewise, the liquid must be of such nature as to permit the refrigerant to pass through the films of liquid to the individual particles in order to reach the strontium chloride. Preferably the liquid is one in which the refrigerant is soluble. Also the liquid should be of such nature that it reduces friction between particles but yet does not remove the friction altogether. In other words, the liquid film which ties together adjacent particles must shear without tearing apart so that the particles may be moved with respect to one another and yet be held together. The resulting structure is analogous to what a popcorn ball would be if bound together with syrup which did not congeal.

As examples of liquids suitable for this purpose may be mentioned lithium nitrate and white mineral oil of the character of that marketed under the trade name of Nujol. I prefer to use lithium nitrate. This material is similar to strontium chloride in that it is normally a solid which absorbs ammonia, but different in that in absorbing ammonia, it forms a liquid rather than a solid throughout the temperature and pressure range in which the strontium chloride forms the ammines mentioned. The liquid formed is stable and of practically constant physical characteristics throughout the operating range of the strontium chloride. Lithium nitrate is given as an example of one substance which has the necessary characteristics to form the desired agglomeration, but other materials may be employed within the scope of my invention. My absorbent structure may be prepared by mixing lithium nitrate with strontium chloride in such proportions as to give from 4 to 10% and preferably 5% LiNO₃ in (LiNO₃+SrCl₂). This may be accomplished, for example, by mixing anhydrous strontium chloride powder with anhydrous lithium nitrate powder to form a substance containing lithium nitrate to the extent of from 4 to 10% (preferably 5%) of the total. After these two substances have been thoroughly mixed the material is cooled in the presence of ammonia gas so as to cause the material to absorb the ammonia forming the strontium chloride 8-ammine. Upon exposure to ammonia the lithium nitrate absorbs ammonia forming a liquid which has the characteristics mentioned above. This material is then ground to a fine powder which to the naked eye appears dry but under the microscope has the appearance of wet snow, and is charged into a generator-absorber such as shown in my companion application referred to. Thereafter the material is heated and cooled to evolve and absorb ammonia for several successive cycles. Upon the first evolution of ammonia the material may have a slight tendency to settle, this being undoubtedly due to imperfect distribution of the lithium nitrate. The subsequent periodic absorption and evolution of ammonia serves to distribute the lithium nitrate and results in a mass of material which to the naked eye has the appearance of a substantially dry, though slightly damp packed powder analogous to packed molding sand. Under the microscope however, the thin films of liquid may be discerned. The mass of powder retains its form during subsequent absorption and evolution of ammonia.

A study of the material after it has been cycled sufficiently to distribute the lithium nitrate and form a mass as described indicates that the films of liquid hold the particles together with sufficient free gas space between them to provide a system of passages for conducting ammonia gas to all of the particles. This space is sufficient to permit the expansion of the individual particles upon absorption of ammonia into the spaces between particles without blocking the spaces, without expanding the mass of the material as a whole and without exerting any great force upon the walls of the container. Likewise upon evolving ammonia, the liquid films hold the individual particles in their approximate relation without falling into the spaces. During expansion and contraction the individual particles must move somewhat with reference to each other, but as has been stated, the liquid films permit this movement while holding the particles together. The liquid in lubricating the particles or reducing the friction of the particles in moving over one another, reduces the pressure required to move the ammonia throughout the system, and permits the particles to slide over one another in expanding and contracting without packing or materially changing the structure as a whole.

While the form of embodiment of the invention as herein disclosed, constitutes a preferred form, it is to be understood that other forms might be adopted, all coming within the scope of the claims which follow.

What is claimed is as follows:

1. An absorbent for refrigerant in refrigerating apparatus of the absorption type consisting of a powdered solid material having the property of entering into chemical combination with the refrigerant, the particles changing volume when so combining with the refrigerant, the particles of the powder being individually wet and bound together with a thin film of liquid, said liquid being permeable to the refrigerant and stable throughout the temperature and pressure range to which the absorbent is subjected.

2. An absorbent for ammonia in refrigerating apparatus of the absorption type consisting of a solid material having the property of forming definite addition-compounds with ammonia, the particles changing volume when so combining with the refrigerant, the particles of the solid being individually wet and bound together with a thin film of liquid, said liquid being permeable to the refrigerant and stable throughout the temperature range to which the absorbent is subjected.

3. An absorbent for refrigerant in a refrigerating apparatus of the absorption type consisting of a solid material having the property of entering into chemical combination with the refrigerant, the particles changing volume when so combining with the refrigerant, the particles of the solid being individually wet and bound together with a thin film of liquid, said liquid being permeable to the refrigerant and stable throughout the temperature and pressure range to which the absorbent is subjected.

4. An absorbent for refrigerant in a refrigerating apparatus of the absorption type consisting of a solid material having the property of entering into chemical combination with the refrigerant, the particles changing volume when so combining with the refrigerant, the particles of the solid being individually wet and bound together with a thin film of liquid in which the refrigerant is soluble, said liquid being stable throughout the temperature and pressure range to which the absorbent is subjected.

5. An absorbent for refrigerant in a refrigerating apparatus of the absorption type consisting of a solid material having the property of entering into chemical combination with the refrigerant, the particles changing volume when so combining with the refrigerant, the particles of the solid being individually wet with a film of liquid sufficiently viscous to cause the particles to adhere to one another, said liquid being permeable to the refrigerant and stable throughout the temperature and pressure range to which the absorbent is subjected.

6. An absorbent for refrigerant in a refrigerating apparatus of the absorption type consisting of a solid material having the property of entering into chemical combination with the refrigerant, the particles changing volume when so combining with the refrigerant, the particles of the solid being individually wet with a film of liquid sufficiently viscous to cause the particles to adhere to one another and sufficiently thin to leave free gas space between the particles for the passage of refrigerant gas throughout the mass of material, said liquid being permeable to the refrigerant and stable throughout the temperature and pressure range to which the absorbent is subjected.

7. An absorbent for refrigerant in a refrigerating apparatus of the absorption type consisting of a solid material having the property of entering into chemical combination with the refrigerant, the particles changing volume when so combining with the refrigerant, the particles of the solid being individually wet with a film of liquid sufficiently viscous to cause the particles to adhere to one another and sufficiently thin to permit the passage of refrigerant gas through the film to the particles, said liquid being permeable to the refrigerant and stable throughout the temperature and pressure range to which the absorbent is subjected.

8. An absorbent for refrigerant in a refrigerating apparatus of the absorption type consisting of a solid material having the property of entering into chemical combination with the refrigerant, the particles changing volume when so combining with the refrigerant, the particles of the solid being individually wet with a film of liquid sufficiently viscous to cause the particles to adhere to one another and of such characteristics as to permit the passage of refrigerant through the film to the particles, said liquid being stable throughout the temperature and pressure range to which the absorbent is subjected.

9. An absorbent for refrigerant in refrigerating apparatus of the absorption type consisting of a body of solid material capable of forming with the refrigerant addition-compounds of high and low order, the particles changing volume when so combining with the refrigerant, the particles of said solid being held together with sufficient free gas space between them to permit the particles to expand in forming addition-compounds of high order and to contract in forming addition-compounds of low order without materially changing the total volume of the mass.

10. An absorbent for refrigerant in refrigerating apparatus of the absorption type consisting of a body of solid material capable of forming with the refrigerant addition-compounds of high and low order the particles changing volume when so combining with the refrigerant, the particles of said solid being held together by adhesive liquid films with sufficient gas space between them to permit the particles to expand in forming addition-compounds of high order and to contract in forming addition-compounds of low order without materially changing the total volume of the mass, said liquid being permeable to the refrigerant and stable throughout the temperature and pressure range to which the absorbent is subjected.

11. An absorbent for refrigerating apparatus consisting of solid material capable of absorbing and evolving refrigerant, said material being characterized by a tendency to expand upon absorbing and to contract upon evolving the refrigerant, and the particles of the solid being held together by adhesive liquid films, the liquid being of such nature as to reduce friction between particles in their movement during expansion and contraction, said liquid being permeable to the refrigerant and stable throughout the temperature and pressure range to which the absorbent is subjected.

12. An absorbent for refrigerating apparatus consisting of solid material capable of absorbing and evolving refrigerant, said material being characterized by a tendency to expand upon absorbing and to contract upon evolving the refrigerant, and the particles of the solid being held together by adhesive liquid films, the liquid being of such nature as to permit particle movement without breaking of the liquid films between adjacent particles during expansion and contraction, said liquid being permeable to the refrigerant and stable throughout the temperature and pressure range to which the absorbent is subjected.

13. An absorbent material adapted to absorb refrigerant in refrigerating apparatus consisting of a mixture of two absorbent substances each adapted to absorb refrigerant, one of the substances forming a solid product with the refrigerant and the other forming a liquid product.

14. An absorbent material adapted to absorb refrigerant in refrigerating apparatus consisting of a mixture of two absorbent substances each adapted to absorb refrigerant, one of the substances being always a solid, and the other being adapted to form both solid and liquid phases.

15. An absorbent for ammonia in refrigerating apparatus of the absorption type consisting of a solid material capable of entering into chemical combination with ammonia, and of lithium nitrate to the extent of from 4 to 10% of the total.

16. An absorbent for ammonia in refrigerating apparatus of the absorption type consisting of a solid material capable of entering into chemical combination with ammonia and lithium nitrate to the extent of approximately 5% of the total ammonia-free absorbent material.

17. An absorbent for ammonia in refrigerating apparatus of the absorption type consisting of a mixture of strontium chloride and lithium nitrate.

18. An absorbent for ammonia in refrigerating apparatus of the absorption type consisting of a mixture of strontium chloride and lithium nitrate, the lithium nitrate being from 4 to 10% of the total ammonia-free absorbent material.

19. An absorbent for ammonia in refrigerating apparatus of the absorption type consisting of a mixture of strontium chloride and lithium nitrate, the lithium nitrate being approximately 5% of the total ammonia-free absorbent material.

In testimony whereof I hereto affix my signature.

HARRY F. SMITH.